(12) United States Patent
Terauchi et al.

(10) Patent No.: US 6,809,728 B2
(45) Date of Patent: Oct. 26, 2004

(54) THREE DIMENSIONAL MODELING APPARATUS

(75) Inventors: Tomoya Terauchi, Saitama (JP); Kouta Fujimura, Abiko (JP); Mikio Hojo, Higashiosaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 235 days.

(21) Appl. No.: 10/225,382

(22) Filed: Aug. 21, 2002

(65) Prior Publication Data

US 2003/0038801 A1 Feb. 27, 2003

(30) Foreign Application Priority Data

Aug. 24, 2002 (JP) ........................................ 2001-255261

(51) Int. Cl.$^7$ .............................................. G06T 17/00
(52) U.S. Cl. ....................................................... 345/420
(58) Field of Search ........................ 345/420; 382/154; 348/40–50

(56) References Cited

U.S. PATENT DOCUMENTS 5,864,640 A * 1/1999 Miramonti et al. ......... 382/312
6,128,405 A * 10/2000 Fujii .......................... 382/154
2002/0051006 A1 * 5/2002 Katagiri et al. ............. 345/653
2002/0159628 A1 * 10/2002 Matusik et al. ............. 382/154
2003/0202691 A1 * 10/2003 Beardsley ................... 382/154
2003/0231173 A1 * 12/2003 Matusik et al. ............. 345/419

FOREIGN PATENT DOCUMENTS

JP         2001-108421        4/2001

* cited by examiner

Primary Examiner—Mark Zimmerman
Assistant Examiner—Peter-Anthony Pappas
(74) Attorney, Agent, or Firm—Pillsbury Winthrop LLP (57) ABSTRACT

Images of a reference object for detecting each camera position are captured by cameras 14, 16 and the relative position between the cameras 14 and 16 is obtained by using the captured images. Then, a target 18 is placed on a turntable 10 onto which reference marks 10a for detecting position are formed, and while the turntable 10 is rotated, images are captured by the cameras 14 and 16. Based on the reference marks 10a on the turntable 10, the positional relationship between the camera 14 and the target 18 is determined, and, based on the relative position of the cameras 14 and 16, the positional relationship between the target 18 and the camera 16 is determined. A three-dimensional model of the target is produced based on the images captured by the cameras 14 and 16. In this manner, a target of relatively large size is easily three-dimensionally modeled.

12 Claims, 5 Drawing Sheets

THREE DIMENSIONAL MODELING APPARATUS

BACKGROUND OF THE INVENTION

1. Field of the Invention

The present invention relates to an apparatus and method for three dimensional (3-D) modeling and to a 3-D modeling program.

2. Description of the Related Art

In recent years, computer graphics have been used in various fields and consequently, 3-D graphics images are in wide use. In order to create a 3-D graphics image, 3-D model data which consists of shape and texture is required. However, because such data is too enormous in size to create manually, it is desired to make obtaining 3-D model more efficient.

To this end, various 3-D scanners are being developed for inputting into a computer the shape and texture (color and pattern) of a 3-D target object.

For instance, Japanese Patent Laid-Open Publication No. 2001-108421 discloses a 3-D modeling apparatus in which a series of images of a target object on a turntable to which marks for detecting position are attached are captured by a camera, in each captured image the camera position is obtained based on the marks attached to the turntable and a silhouette is extracted, and 3-D model data is produced based on the position and silhouette information.

By using such a 3-D modeling apparatus, it is possible to obtain 3-D graphics data of a target object, and it is thus possible to reduce the amount of work for initial input to substantially zero.

However, in the apparatus disclosed in Japanese Patent Laid-Open Publication No. 2001-108421, the overall target object and the turntable must always fit in the captured image. Therefore, when the target object is large, the camera must be moved away from the target object, thus causing degradation in the precision of the shape and the fineness of the texture. There is also a problem in that a broad space is required for capturing images.

SUMMARY OF THE INVENTION

The present invention is conceived to solve the above problem and an object of the present invention is to provide an apparatus and method for 3-D modeling which are easy and cost less, and which can accommodate a larger target object. Another object of the present invention is to provide a medium onto which the 3-D modeling program is recorded.

According to an aspect of the present invention, a plurality of cameras are used. Because a plurality of cameras are used, it is possible to capture images of the entirety of a relatively large target object at a close distance. Therefore, modeling with highly precise acquisition of shape and texture can be performed using a compact apparatus and the cost for the apparatus can be reduced. In addition, because the calibration among the plurality of cameras can be performed based on captured images of a reference object designed to detect camera position, precise adjustment of the positions of cameras is not required, thus allowing for easier operations.

According to another aspect of the present invention, it is preferable that the plurality of cameras be placed at positions separated from each other in the vertical direction. With such a configuration, the entirety of a vertically elongated target such as a person can be easily captured.

According to yet another aspect of the present invention, it is preferable that a plurality of cameras be synchronized while the turntable is continuously rotated.

By employing a continuous rotation, it is possible to reduce change in the angular acceleration and to effectively prevent the target object such as a person from moving during the rotation.

According to another aspect of the present invention, it is preferable that a voting process be applied separately to the images captured by each camera to generate voxel data and that the voxel data are then synthesized. In this manner, a voting process identical to that used for a case of one camera can be employed, and a 3-D modeling process can be performed by a simple method of, for example, taking the logical sum of the obtained voxel data.

According to another aspect of the present invention, it is preferable that the captured images from each camera be synthesized based on the relative viewing position of each camera and a voting process be applied to the synthesized data to generate voxel data. With such a configuration, the entirety of the target must be captured only in the data after the synthesis, and therefore, the degree of freedom for placing the cameras can be improved.

The present invention also relates to a method for 3-D modeling using the apparatus as described above or a program which uses such a method.

DESCRIPTION OF THE PREFERRED EMBODIMENT

A preferred embodiment of the present invention will now be described with reference to the drawings.

Figure 1:
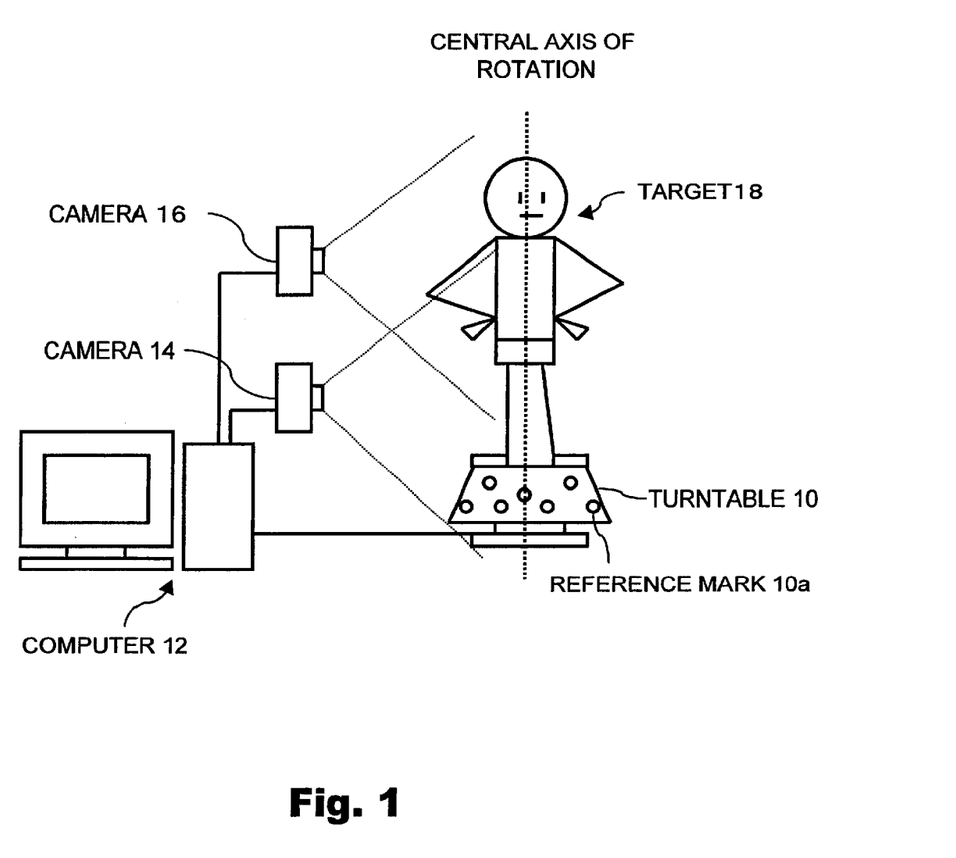
FIG. 1 is a diagram showing the overall structure.

FIG. 1 is a diagram schematically showing a 3-D modeling apparatus according to a preferred embodiment of the present invention. As shown, this apparatus comprises a turntable 10. The turntable 10 can be rotated by a built-in motor and has an overall shape of a trapezoid pyramid. On the peripheral surface of the turntable, a plurality of reference marks 10a for detecting position are provided. The structure of the turntable 10 is identical to that disclosed in Japanese Patent Laid-Open Publication No. 2001-108421 and circular reference marks 10a of a plurality of colors are placed at predetermined positions.

A computer 12 is connected to the turntable 10 for controlling the rotation of the turntable 10.

Cameras 14 and 16 which are placed at upper and lower positions in the vertical direction are connected to the computer 12. The positions of the cameras 14 and 16 are set so that the range of image capture for cameras 14 and 16 differ from each other, but a portion of the ranges of image capture overlap.

A target 18 to be 3-D modeled is placed on the turntable 10. In this example, the target 18 is a person. The range of image capture for the upper camera 16 includes the central and upper portions of the target 18 and the range of image capture for the lower camera 14 includes the central and lower portions of the target 18 and the turntable 10.

With such a configuration, the computer 12 processes the 3-D modeling of target 18 based on the images captured by the cameras 14 and 16. The operation of this process will now be described.

Figure 2:
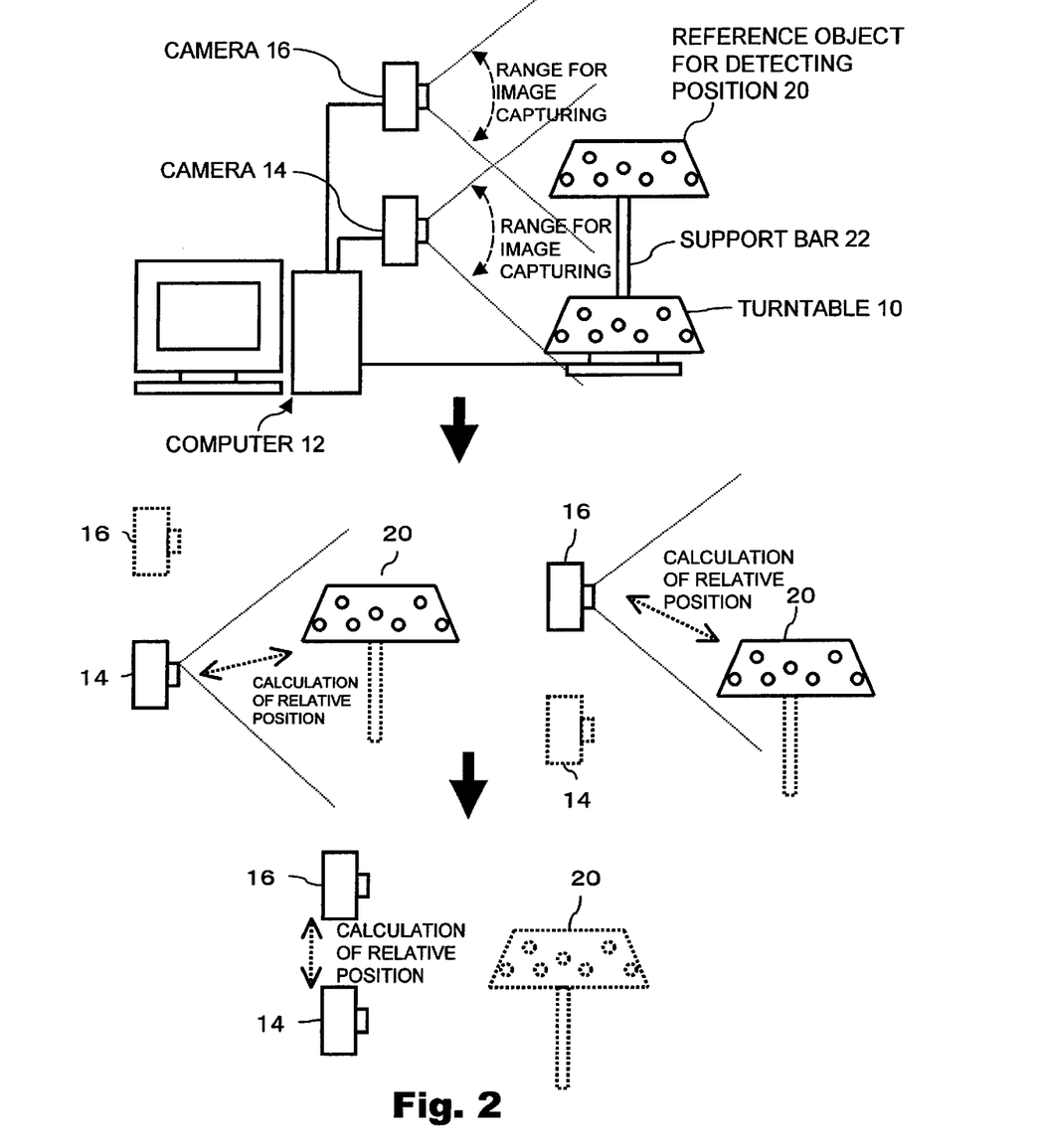
FIG. 2 is a diagram for explaining detection of relative positions of cameras.

First, the relative positions of the cameras 14 and 16 are calculated. For this purpose, as shown in FIG. 2, a reference object 20 designed for detecting camera position is placed so as to be capable of being captured by both cameras 14 and 16. In FIG. 2, the reference object 20 is set at a position corresponding to the central portion of the target 18 using a support bar 22 which is detachably attached to the upper surface of the turntable 10 and which extends upwards.

In FIG. 2, the reference object 20 has the same shape as the turntable 10 and the same circular reference marks as the turntable 10, but the embodiment is not limited to such a configuration, and the reference object 20 may be of any shape and the reference marks maybe of any shape other than a circle as long as the shape (position) of the reference marks is known in advance and the position of the camera can be detected.

From the images of the reference object 20 captured by the camera 14, the computer 12 calculates the relative position of the camera 14 with respect to the reference object 20. Similarly, from the images of the reference object 20 captured by the camera 16, the computer 12 calculates the relative position of the camera 16 with respect to the reference object 20. For example, the computer 12 detects the positions of the cameras 14 and 16 as three-dimensional coordinates with the origin at a predetermined position of the reference object.

In this manner, because relative positions of both cameras 14 and 16 with respect to the same reference object 20 are obtained, the computer 12 can calculate the relative position between the cameras 14 and 16. In this example, because the lower camera 14 is placed at a position to capture the images of the turntable, the relative position of the upper camera 16 with respect to the lower camera 14 is calculated.

Then, the target 18 is placed on the turntable 10 and images are captured by the cameras 14 and 16 while the turntable 10 is rotated. Predetermined reference marks 10a are provided on the surface of the turntable 10. Images of these reference marks 10a are captured by the camera 14 so that the relative position of the camera 14 with respect to the turntable 10 can be calculated. Then, assuming that the target 18 does not move on the turntable 10, it is possible to detect the direction of the images for each pixel of the images of the target 18 captured by the camera 14.

Moreover, because the relative position between the cameras 14 and 16 is known from the process described above, the relative position of the camera 16 with respect to the turntable 10 is also calculated. By synchronizing the cameras 14 and 16 for capturing images, it is possible to identify the direction (viewpoint of the camera) of the images captured by the camera 16.

Therefore, silhouette images of the target 18 can be produced from the captured images at each rotational angle obtained by each of the cameras 14 and 16. For example, by obtaining 36 captured images at every 10 degrees of rotational angle, 36 captured images can be obtained respectively from each of the cameras 14 and 16 and the silhouette images of the target 18 can be produced from these images.

In each silhouette image, the rotation angle of the turntable 10, that is, the direction of the target 18, is known. Thus, a voting process can be applied to the silhouette image to generate voxel data. From the obtained voxel data, polygon data can be produced. Finally, by obtaining texture from the captured images and assigning the obtained texture to each polygon, a 3-D model is produced.

As described, according to the present embodiment, a plurality of cameras 14 and 16 are used. Therefore, it is possible to capture images of even a relatively large target 18 at a close distance, and thus, it is possible to produce a highly precise 3-D model with a relatively small apparatus.

In addition, because detection of the positions of the cameras 14 and 16 can be performed by using captured images of the reference object 20, it is possible to alter the relative position between the cameras 14 and 16 depending on the type of the target 18. Alternatively, or in addition, it is also possible to change the relative position of the cameras 14 and 16 with respect to the turntable 10.

The images captured by the cameras 14 and 16 are distinct images with overlapping portions and the modeling process needs a synthesis process. Two methods for synthesis are described below, and either one can be employed.

(i) In a first method, a separate voting process is applied based on the images captured by each of the cameras 14 and 16 to generate voxel data and then a logical sum is taken between the obtained voxel data for synthesis. This method has an advantage that the process can be performed quickly. On the other hand, because in this method voxels are produced for the target 18 for each of the cameras 14 and 16 as shown in FIG. 2, the target 18 must fit entirely in the range for image capture of each of the cameras 14 and 16 in directions perpendicular to the rotational axis of the target 18 (horizontal direction). In other words, although no problem arises for division of the regions in the direction along the rotational axis, no portion of the target may extend beyond the boundary of the range for image capture during the rotation.

(ii) In a second method, for each combination of the images captured by the cameras 14 and 16, which includes the entire target 18, a logical summation and synthesis is performed in the voxel space and a voting process is applied to the result of synthesis to generate voxel data. This method requires a comparatively greater amount of calculation. However, it is only required that the entire target fit in the combination of the images captured by the cameras, and thus, the range for the image capture of the camera for the target can be divided as desired.

Through either of these methods, it is possible to synthesize the images captured by the cameras 14 and 16 to obtain a 3-D model.

Figure 3:
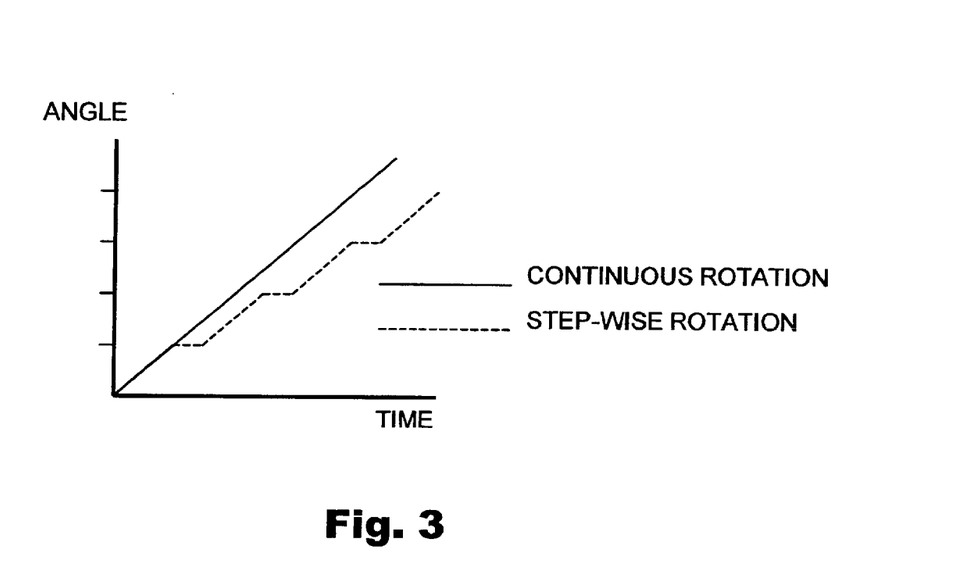
FIG. 3 is a diagram showing a change in angle caused by rotation.
Figure 4:
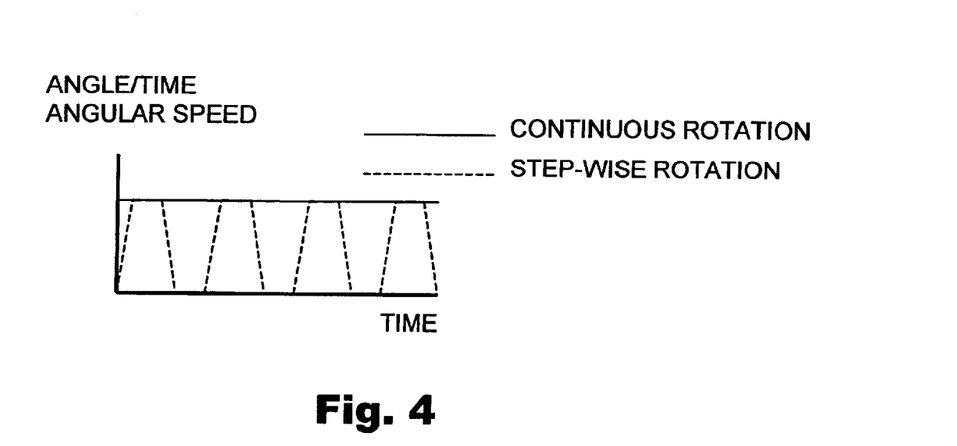
FIG. 4 is a diagram showing a change in angular speed caused by rotation.

It is preferable that the turntable 10 rotate continuously with a uniform angular speed. In other words, when the turntable 10 is step-wise rotated as shown by a dotted line in FIG. 3, the angular speed changes significantly as shown by a dotted line in FIG. 4. On the other hand, for a uniform speed, the angular speed is constant. When the target 18 is a person and the turntable 10 is rotationally actuated step-wise (i.e. moved and stopped), there is a possibility that the position of the target 18 will be influenced by the acceleration and the position of the target 18 may change. On the other hand, with a continuous rotation (rotation with a uniform angular speed), the position of the target 18 can be more easily stabilized. To achieve a constant speed rotation, it is possible to employ a method, for example, such that the turntable is accelerated during the first half rotation so that the angular speed reaches the desired constant angular speed, images are captured during the next one full rotation, and the turntable is decelerated in the next half rotation to eventually stop.

In the case of continuous rotation, because the images are captured while the target 18 is rotating, the cameras 14 and 16 must be synchronized to capture the images. By synchronizing the cameras, it is possible to set the angles for image capture for both cameras to be the same (or in a known relationship). Animated images can also be captured. For the step-wise rotation, the image can be captured when the target is not moving, and thus, it is not required to capture the images simultaneously by both cameras 14 and 16. However, the images must be captured by all cameras while the turntable 10 is at the same position.

The conditions for placement of the cameras can be summarized as follows.

(I) All cameras must satisfy at least one of the following conditions.

(a) Images of a turntable 10 with reference marks can be captured and the image capture position can be calculated.

(b) Images of a reference object can be captured and the image capture position can be calculated, the reference object 20 being identical to and placed at the same position as the reference object 20 captured by a camera which captures images of a turntable 10 with reference marks.

(c) Images of a reference object 20 can be captured, the reference object 20 being identical to and at the same position as the reference object 20 captured by a camera in which the image capture position can be calculated.

(II) In addition, when employing the synthesis method (ii) as described above, it is necessary to capture the entire object in the overall image obtained from the images captured by the cameras. On the other hand, when employing the synthesis method (i), it is necessary that the ranges for image capture for the cameras satisfy the following condition: in each of regions divided in the direction along the central axis of rotation, all portions of the images in that region must be captured and the combination of all such regions results in the entire region where the target is present.

In the above embodiment, two cameras are used, but the present invention is not limited to such a configuration, and three or more cameras may also be used. In such a configuration, when a separate voting process is applied for individual images captured by the cameras for synthesis using method (i), the region must be divided in the direction along the rotational axis as shown in FIG. 1.

Figure 5:
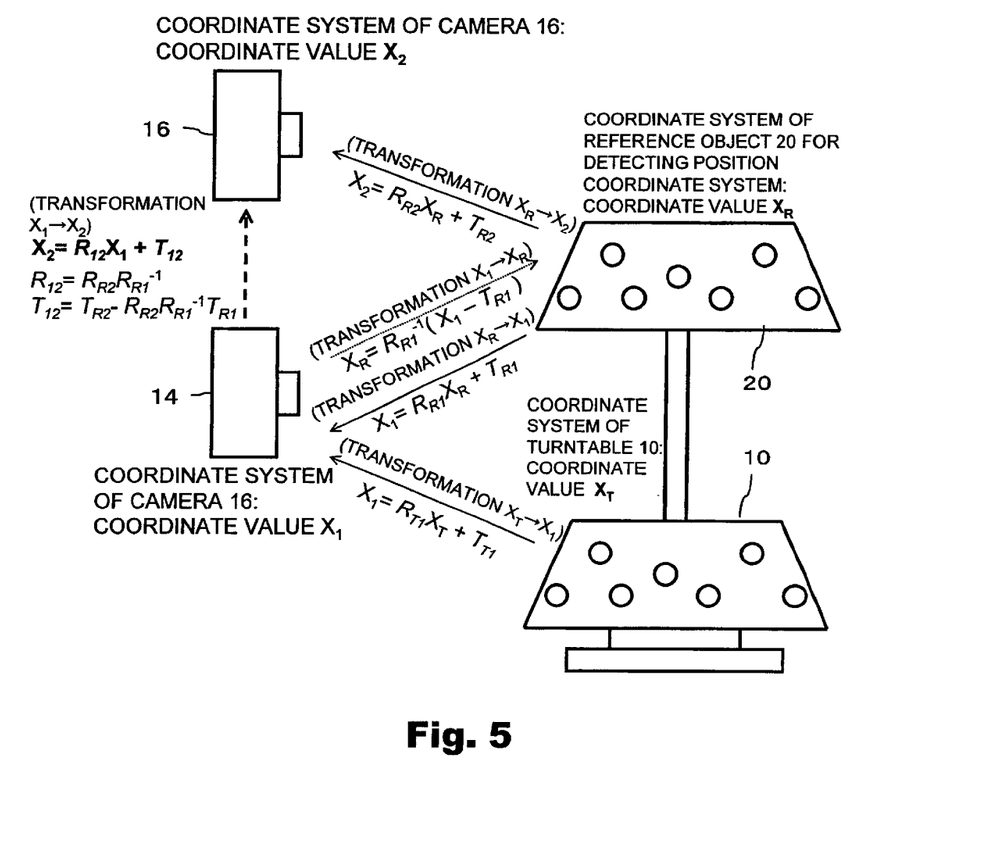
FIG. 5 is a diagram for explaining calculation of transformation matrices for coordinate transformations.
Figure 6:
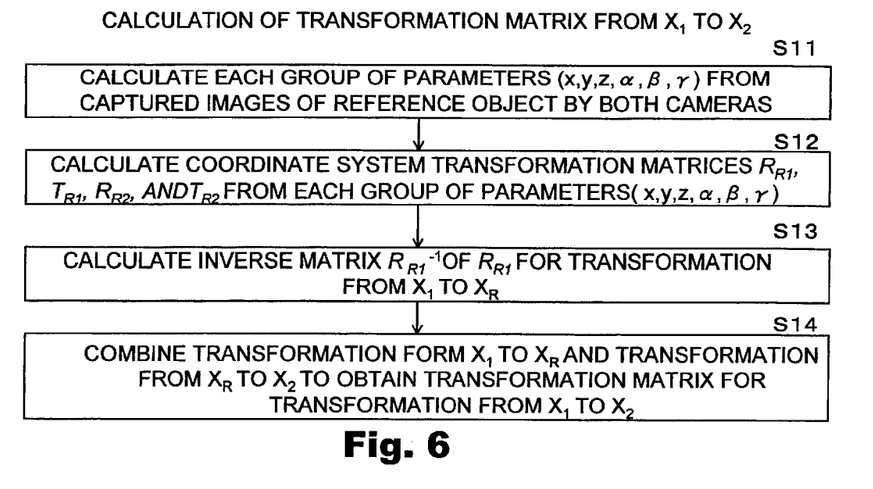
FIG. 6 is a flowchart showing an operation for calculating transformation matrices from the coordinate system of a camera 14 to the coordinate system of a camera 16.
Figure 7:
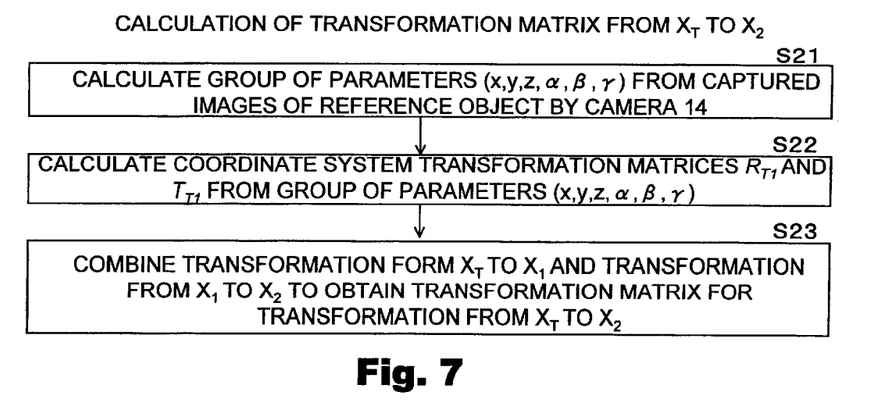
FIG. 7 is a flowchart showing calculation of the position of viewpoint for a camera 16 with respect to the turntable.

Calculation of the relative position of the cameras will now be described with reference to FIGS. 5, 6, and 7. In FIG. 5 and following descriptions, notation $X_i$ indicates the coordinate values in each coordinate system, notation $R_{ij}$ indicates a transformation matrix (rotational component) from i to j, and notation $T_{ij}$ indicates a transformation matrix (translation component) from i to j. For the subscripts i, the letter R indicates the reference object for detecting position, the letter T indicates the turntable, the numeral "1" indicates the camera 14, and the numeral "2" indicates the camera 16.

Cameras 14 and 16 captures images of a reference object 20 for detecting position, and a group of parameters representing camera viewpoint position, (x, y, z, $\alpha$, $\beta$, $\gamma$), is calculated by using the captured images for each of the cameras (step S11). Here, the parameters x, y, and z represent the relative position of each camera with respect to the reference object 20 for detecting position and the parameters $\alpha$, $\beta$, and $\gamma$ represent the amount of rotation of the coordinate system of each camera with respect to the coordinate system of the reference object.

From the groups of parameters (x, y, z, $\alpha$, $\beta$, $\gamma$), coordinate system transformation matrices $R_{R1}$, $T_{R1}$, $R_{R2}$, and $T_{R2}$ are calculated (step S12). More specifically, transformation matrices $R_{R1}$ and $T_{R1}$ which transform the coordinate value $X_R$ in the coordinate system of the reference object 20 into the coordinate system of the camera 14 by $X_1 = R_{R1}X_R + T_{R1}$ are calculated, and, similarly, transformation matrices $R_{R2}$ and $T_{R2}$ which transform the coordinate value $X_R$ in the coordinate system of the reference object 20 into the coordinate system of the camera 16 by $X_2 = R_{R2}X_R + T_{R2}$ are calculated.

Then, an inverse matrix $R_{R1}^{-1}$ of the transformation matrix $R_{R1}$ is calculated in order to transform the coordinate value $X_1$ of the camera 14 into the coordinate value $X_R$ of the reference object (step S13). Then, the transformation from $X_1$ to $X_R$ and the transformation from $X_R$ to $X_2$ are combined to obtain transformation matrices for transformation from $X_1$ to $X_2$ (step S14). More specifically, because the relationships $R_{12} = R_{R2}R_{R1}^{-1}$ and $T_{12} = T_{R2} - R_{R2}R_{R1}^{-1}T_{R1}$ can be deduced from $X_2 = R_{12}X_1 + T_{12}$, the transformation matrices for transformation from $X_1$ to $X_2$ can be obtained using these relationships.

The view position of the camera 16 with respect to the turntable 10 is calculated as follows. As shown in FIG. 7, first, a group of parameters, (x, y, z, $\alpha$, $\beta$, $\gamma$), is calculated by using the captured images of reference marks on the turntable 10 captured by the camera 14 (step S21). Then, by using the group of parameters, (x, y, z, $\alpha$, $\beta$, $\gamma$), the coordinate system transformation matrices $R_{T1}$ and $T_{T1}$ are calculated (step S22). More specifically, transformation matrices $R_{T1}$ and $T_{T1}$ that transform the coordinate values with the relationship $X_1 = R_{T1}X_T + T_{T1}$ are calculated.

By combining the transformation from $X_T$ to $X_1$ and the transformation from $X_1$ to $X_2$, the transformation matrices for transforming from $X_T$ to $X_2$ are determined. In this manner, the viewpoint position of the camera 16 with respect to the turntable 10 can be calculated, and thus, processes similar to those applied to the images of the target 18 on the turntable 10 captured by the camera 14 can be applied to the images captured by the camera 16.

The determination of the transformation matrices is generally identical to that disclosed in Japanese Patent Laid-Open Publication No. Hei 11-96374 and will not be described in detail.

In this manner, using the 3-D modeling method according to the present embodiment, it is possible to easily obtain a 3-D model of various targets. For example, the 3-D modeling method can be applied to an animated, 3-D display of various products and creation of initial data for animation characters. Moreover, by producing a silhouette of a person, the method can be used for measuring the size when tailoring clothes.

As described, according to the present invention, by employing a plurality of cameras, it is possible to capture entire images of even a relatively large target at a close distance. Therefore, it is possible to perform a highly precise 3-D modeling process with a compact apparatus and to reduce the overall cost of the apparatus. Moreover, because the adjustment between the plurality of cameras can be performed by simply capturing images of a reference object for detecting position, no precise adjustment is required for positioning the cameras, thus simplifying the operation.

Furthermore, by placing the plurality of cameras to be apart from one another in the vertical direction to allow capture of images of the modeling target object on the turntable from positions shifted in the vertical direction, it is possible to easily capture the entirety of a target elongated in the vertical direction, such as a person.

In addition, by setting the rotation of the turntable to be continuous, it is possible to minimize the change in the angular acceleration and to facilitate the modeling target, such as a person, maintaining its position.

Moreover, by applying a separate voting process to images captured by each camera and then synthesizing the voxel data, a voting process identical to the voting process when one camera is used can be applied, and the entire voxel data can be obtained by a simple method such as, for example, taking the logical sum of all of the obtained voxel data.

Also, with a configuration of synthesizing the images captured by the cameras based on the relative position of the cameras and then producing the voxel data by applying a voting process based on the synthesized data, it is only required that the overall target be captured at least in the synthesized data. Because of this, the degree of freedom for placement of the cameras can be improved.

What is claimed is:

1. A three-dimensional modeling apparatus comprising:
   means for calculating relative positions among a plurality of cameras by using captured images of a reference object for detecting each camera position, the images being obtained from the plurality of cameras; and
   means for producing a three-dimensional model of a target object from captured images, obtained from the plurality of cameras, of the target object on a turntable having reference marks for detecting position provided thereon, the modeling target rotating with the turntable, wherein
      the means for producing a three-dimensional model calculates, based on images captured by a camera which captures images of the turntable, position information with respect to the turntable and the camera;
      the means for producing a three-dimensional model further calculates, using the position information and the relative position obtained by the means for calculating relative positions, position information with respect to the turntable and a camera which does not capture images of the turntable; and
      a three-dimensional model of the modeling target is produced based on the obtained position information of each camera and images captured by each camera.

2. A three-dimensional modeling apparatus according to claim 1, wherein
   the plurality of cameras are placed at positions separated in the vertical direction so that images of the modeling target on the turntable are captured from different vertical positions.

3. A three-dimensional modeling apparatus according to claim 1, wherein, while the turntable is continuously rotated, a plurality of images are captured by each of the plurality of cameras which are synchronized with each other.

4. A three-dimensional modeling apparatus according to claim 1, wherein a voting process is separately applied to the images captured by each camera to generate voxel data, and the voxel data are then synthesized.

5. A three-dimensional modeling apparatus according to claim 1, wherein images captured by the cameras are synthesized based on the relative positions of the cameras, and a voting process is then applied based on the synthesized data to produce voxels.

6. A method for producing a three-dimensional model, comprising the steps of:
   calculating relative positions among a plurality of cameras by capturing images of a reference object for detecting position by the plurality of cameras; and
   capturing images, with the plurality of cameras, of a modeling target on a turntable having reference marks for detecting position provided thereon, the modeling target rotating with the turntable, and producing a three-dimensional model of the modeling target from the obtained captured images, wherein
      in the step for capturing images and producing a three-dimensional model, position information with respect to the turntable and a camera which captures images of the turntable is calculated based on the images captured by the camera, and, using the position information and the relative position obtained in the step for calculating the relative positions, position information with respect to the turntable and a camera which does not capture images of the turntable is calculated; and
      a three-dimensional model of the modeling target is produced based on the obtained position information of each camera and images captured by each camera.

7. A three-dimensional modeling method according to claim 6, wherein while the turntable is continuously rotated, a plurality of images are captured by each of the plurality of cameras which are synchronized with each other.

8. A three-dimensional modeling method according to claim 6, wherein a voting process is separately applied to the images captured by each camera to generate voxel data, and the voxel data are then synthesized.

9. A three-dimensional modeling method according to claim 6, wherein images captured by the cameras are synthesized based on the relative positions of the cameras, and a voting process is then applied based on the synthesized data to generate voxel data.

10. A three dimensional modeling program stored in memory, for producing a three-dimensional model of a modeling target from a plurality of images of the modeling target captured by a plurality of cameras, which causes the execution of the steps of:
    calculating relative positions among a plurality of cameras from captured images of a reference object for detecting position, the images obtained from a plurality of cameras; and
    producing a three-dimensional model of a modeling target from captured images, obtained from the plurality of cameras, of the modeling target on a turntable having reference marks for detecting position provided thereon, the modeling target rotating with the turntable, wherein
       in the step for producing three-dimensional model, position information with respect to the turntable and a camera which captures images of the turntable is calculated based on the images captured by the camera, and, using the position information and relative position information obtained in the step of calculating the relative positions, position information with respect to the turntable and a camera which does not capture images of the turntable is calculated, and a three-dimensional model of the modeling target is produced based on the obtained position information of each camera and images captured by each camera.

11. A three-dimensional modeling program product according to claim 10, wherein a voting process is separately applied to the images captured by each camera to generate voxel data, and the voxel data are then synthesized.

12. A three-dimensional modeling program product according to claim 10, wherein images captured by the cameras are synthesized based on the relative positions of the cameras, and a voting process is then applied based on the synthesized data to generate voxel data.

* * * * *